(12) United States Patent
Kim

(10) Patent No.: US 11,843,122 B2
(45) Date of Patent: Dec. 12, 2023

(54) METHOD FOR PREPARING FUEL CELL CATALYST ELECTRODE AND FUEL CELL CATALYST ELECTRODE PREPARED THEREFROM

(71) Applicant: HYUNDAI MOBIS Co., Ltd., Seoul (KR)

(72) Inventor: Jung Hoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/856,736

(22) Filed: Jul. 1, 2022

(65) Prior Publication Data

US 2023/0014828 A1    Jan. 19, 2023

(30) Foreign Application Priority Data

Jul. 8, 2021    (KR) .................. 10-2021-0089746

(51) Int. Cl.
| | |
|---|---|
| *H01M 4/88* | (2006.01) |
| *H01M 4/92* | (2006.01) |
| *H01M 8/1004* | (2016.01) |
| *H01M 8/10* | (2016.01) |
| *H01M 4/86* | (2006.01) |

(52) U.S. Cl.
CPC ......... *H01M 4/8828* (2013.01); *H01M 4/926* (2013.01); *H01M 8/1004* (2013.01); *H01M 2004/8684* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 8,986,908 B2 | 3/2015 | Lee | |
| 2014/0011119 A1* | 1/2014 | Lee | ..................... H01M 4/9016 429/535 |

FOREIGN PATENT DOCUMENTS

| | | |
|---|---|---|
| KR | 10-1438891 B1 | 9/2014 |
| KR | 10-1664627 B1 | 10/2016 |

* cited by examiner

*Primary Examiner* — Haroon S. Sheikh
(74) *Attorney, Agent, or Firm* — MORGAN, LEWIS & BOCKIUS LLP

(57) ABSTRACT

The present disclosure relates to a method for preparing a fuel cell catalyst electrode, the fuel cell catalyst electrode prepared therefrom, a membrane electrode assembly including the fuel cell catalyst electrode, and a fuel cell including the membrane electrode assembly.

17 Claims, 1 Drawing Sheet

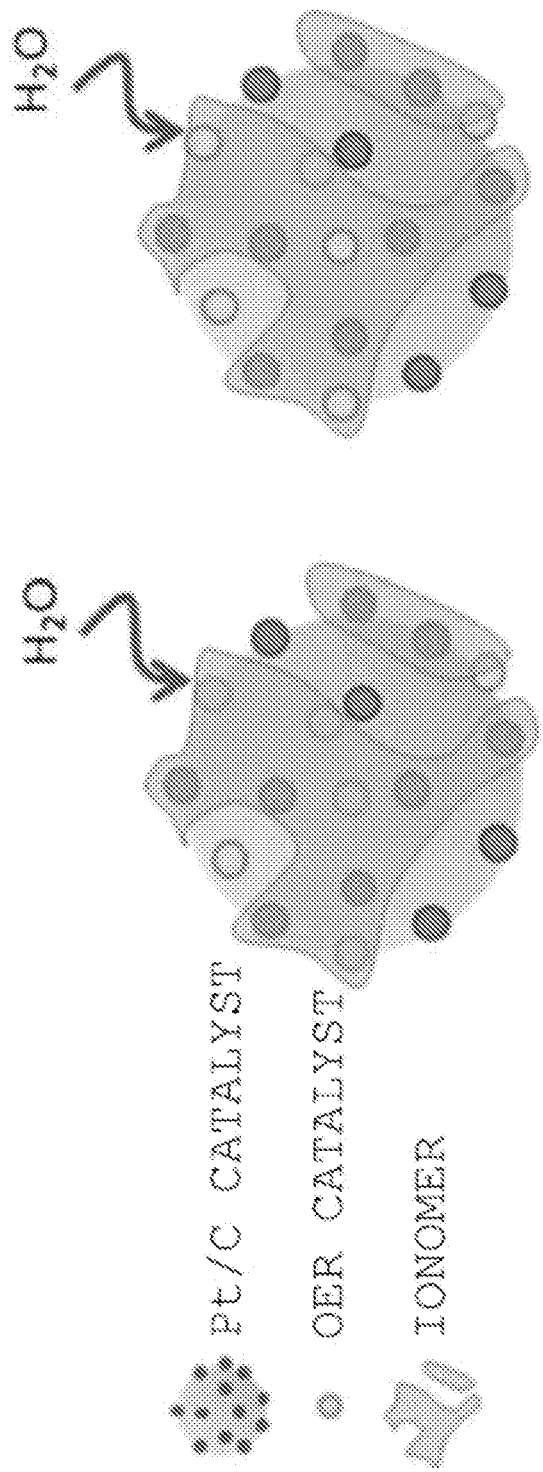

METHOD FOR PREPARING FUEL CELL CATALYST ELECTRODE AND FUEL CELL CATALYST ELECTRODE PREPARED THEREFROM

CROSS-REFERENCE TO RELATED APPLICATION

This application claims the benefit of priority to Korean Patent Application No. 10-2021-0089746, filed in the Korean Intellectual Property Office on Jul. 8, 2021, the entire contents of which are incorporated herein by reference.

TECHNICAL FIELD

The present disclosure relates to a method for preparing a fuel cell catalyst electrode, and more particularly, to a method for preparing a fuel cell catalyst electrode capable of preparing a fuel cell catalyst electrode with improved durability against a reverse voltage, and the fuel cell catalyst electrode prepared therefrom.

BACKGROUND

A fuel cell is to electrochemically oxidize a fuel such as hydrogen, methanol, or the like in the cell to convert chemical energy of the fuel into electrical energy. In particular, a polymer electrolyte membrane fuel cell (PEFC) uses a solid polymer electrolyte membrane having ion conductivity so as to enable low-temperature operation compared to high-temperature operation fuel cells such as a solid oxide fuel cell (SOFC) and realize a simple system, so that the PEFC is used as a power source for a vehicle, a building, and the like.

Such polymer electrolyte membrane fuel cell includes a membrane electrode assembly (MEA) including a negative electrode (a hydrogen electrode), a positive electrode (an air electrode), and a hydrogen ion conductive polymer electrolyte membrane. In this regard, each of the negative electrode (the hydrogen electrode) and the positive electrode (the air electrode) exists in a form in which homogeneous or heterogeneous noble metal catalysts capable of causing an oxidation reaction of the fuel and a reduction reaction of oxygen are dispersed evenly on a surface of a porous carrier. Carbon is generally used as the porous carrier. The carbon has excellent electrical conductivity, chemical stability, and the like during an electrochemical reaction, but exhibits weak oxidation properties under a high potential condition, which is one of main degradation mechanisms of a fuel cell performance. Accordingly, to minimize degradation of the carbon used in the fuel cell, schemes for enhancing durability of a carbon material itself, for improving a component structure and a system such that hydrogen supply is smooth even in various operating environments, or for using an oxygen evolution reaction (OER) catalyst together have been proposed.

In particular, when the fuel cell is generating current via the electrochemical reaction, a normal hydrogen oxidation reaction (HOR) as shown in Reaction formula 1 below proceeds at the negative electrode (the hydrogen electrode).

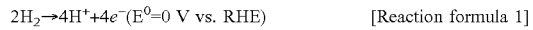

[Reaction formula 1]

However, when hydrogen is insufficient or not supplied, carbon corrosion as shown in Reaction formulas 2 and 3 below and a water decomposition reaction as shown in Reaction formula 4 below occur.

[Reaction formula 2]

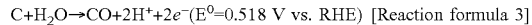

[Reaction formula 3]

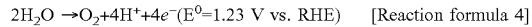

[Reaction formula 4]

In general, a situation in which the hydrogen is insufficient or not supplied may occur frequently in a case of start-up/shutdown, flooding, and cold start of the fuel cell, abnormal operation in a hydrogen supply system, and the like. As described above, a reverse voltage generated when the hydrogen is rare causes the carbon in the electrode to perform an oxidation reaction with water, causing the direct carbon corrosion and damage to the electrode. To prevent the rapid carbon corrosion or to minimize the carbon corrosion, a scheme of using the OER catalyst together in the electrode has been proposed.

For example, Korea Patent No. 10-1664627 discloses a method for preparing a polymer electrolyte membrane fuel cell of forming an anode electrode by coating an anode slurry containing a hydrogen oxidation reaction catalyst (a HOR catalyst) and a water electrolysis catalyst (an OER catalyst) on a polymer film and drying the anode slurry. However, when preparing the slurry by mixing the HOR catalyst, the OER catalyst, and an electrode binder, which is an ionomer, with each other in preparing the negative electrode slurry, there is a problem that not only the HOR catalyst but also the OER catalyst are covered by the electrode binder. In this case, there is a limit in inducing the oxygen evolution reaction because the OER catalyst is not sufficiently exposed. Therefore, it is not able to be said that durability against a reverse voltage environment is sufficient. As a fuel shortage continues, the fuel shortage eventually causes the negative electrode to deteriorate.

In addition, Korea Patent No. 10-1438891 discloses a method for preparing the anode for the fuel cell in which the electrolysis catalyst (the OER catalyst) for electrolysis of the water is synthesized into particles and simultaneously loaded on the electrode for the anode by an atomic layer deposition (ALD) method. However, because an electrode catalyst layer, that is, a HOR catalyst layer, is in a form of a film stacked with a small thickness, when depositing the OER catalyst using a deposition technique such as the atomic layer deposition, it is difficult for OER catalyst to be coated into the HOR catalyst layer, and the coating is inevitably concentrated at an outer portion of the HOR catalyst layer. In this case, even the HOR catalyst has to be coated with the OER catalyst, which rather reduces an active reaction area of the hydrogen oxidation reaction by the HOR catalyst, thereby lowering electrode activation of the negative electrode.

PRIOR ART LITERATURE

Patent Literature (Patent Literature 1) KR10-1664627B1
(Patent Literature 2) KR10-1438891B1

SUMMARY

The present disclosure has been made to solve the above-mentioned problems occurring in the prior art while advantages achieved by the prior art are maintained intact.

An aspect of the present disclosure provides a fuel cell catalyst electrode in which both of a hydrogen oxidation reaction (HOR) and an oxygen evolution reaction (OER)

may effectively occur in a catalyst electrode of a fuel cell, especially, a negative electrode (a hydrogen electrode).

Another aspect of the present disclosure provides a method for preparing a fuel cell catalyst electrode for preparing a fuel cell catalyst electrode having improved durability against a reverse voltage by improving a water decomposition performance of a negative electrode (a hydrogen electrode) even when exposed to a reverse voltage environment.

Another aspect of the present disclosure provides a fuel cell catalyst electrode prepared from the above fuel cell catalyst electrode preparing method to improve the durability against the reverse voltage, thereby achieving a high efficiency and improving long-team operation stability of the fuel cell.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for preparing a fuel cell catalyst electrode includes dispersing and mixing a hydrogen oxidation reaction catalyst, a binder, and a first solvent to prepare a first catalyst slurry, heat-treating and pulverizing the first catalyst slurry to prepare catalyst precursor powder, dispersing and mixing the catalyst precursor powder, an oxygen evolution reaction catalyst, and a second solvent to prepare a second catalyst slurry, and preparing an electrode with a catalyst layer by coating or transferring the second catalyst slurry onto a substrate.

According to another aspect of the present disclosure, a fuel cell catalyst electrode includes a substrate, and a catalyst layer disposed on a surface of at least one side of the substrate, the catalyst layer contains a hydrogen oxidation reaction catalyst, an oxygen evolution reaction catalyst, and a binder, and a ratio of the oxygen evolution reaction catalyst exposed to the outside of the binder is higher than a ratio of the oxygen evolution reaction catalyst existing between the hydrogen oxidation reaction catalyst and the binder.

According to another aspect of the present disclosure, a membrane electrode assembly includes a negative electrode, a positive electrode, and a polymer electrolyte membrane interposed between the negative electrode and the positive electrode, and the negative electrode is the fuel cell catalyst electrode.

According to another aspect of the present disclosure, a fuel cell includes the membrane electrode assembly.

BRIEF DESCRIPTION OF THE DRAWINGS

The above and other objects, features and advantages of the present disclosure will be more apparent from the following detailed description taken in conjunction with the accompanying drawings:

FIG. 1 is a schematic diagram showing shapes of fuel cell catalyst electrodes prepared in Example and Comparative Example of the present disclosure.

DETAILED DESCRIPTION

Hereinafter, the present disclosure will be described in more detail to help understand the present disclosure.

Terms or words used in the present specification and claims should not be construed as being limited to conventional or dictionary meanings. Based on a principle that the inventor may appropriately define a concept of the term to describe the invention thereof in the best way, the terms or the words should be interpreted with a meaning and a concept consistent with the technical idea of the present disclosure.

In the present disclosure, numbers such as terms 'first' and 'second' are only numbers arbitrarily written to easily distinguish the components, and do not give a special meaning to each component.

The present disclosure provides a method for preparing a fuel cell catalyst electrode for preparing the fuel cell catalyst electrode, specifically, a negative electrode of a fuel cell.

According to one embodiment of the present disclosure, the fuel cell catalyst electrode preparing method may include dispersing and mixing a hydrogen oxidation reaction catalyst, a binder, and a first solvent to prepare a first catalyst slurry (S10), heat-treating and pulverizing the first catalyst slurry to prepare catalyst precursor powder (S20), dispersing and mixing the catalyst precursor powder, an oxygen evolution reaction catalyst, and a second solvent to prepare a second catalyst slurry (S30), and preparing an electrode with a catalyst layer by coating or transferring the second catalyst slurry onto a substrate (S40).

According to one embodiment of the present disclosure, step S10 may be a step for preparing the first catalyst slurry for forming a catalyst layer containing the hydrogen oxidation reaction catalyst in the fuel cell catalyst electrode, particularly, the negative electrode.

According to one embodiment of the present disclosure, the hydrogen oxidation reaction catalyst may contain a catalyst metal and a conductive material carrying the catalyst metal. As a specific example, the catalyst metal may include at least one selected from a group consisting of platinum, gold, silver, palladium, iridium, rhodium, ruthenium, iron, cobalt, nickel, chromium, tungsten, manganese, vanadium, and alloys thereof, and may be platinum as a more specific example. In addition, the conductive material may be activated carbon, for example, porous activated carbon for carrying the catalyst metal. As a more specific example, the hydrogen oxidation reaction catalyst may be a Pt/C catalyst in which platinum is carried by a porous carbon carrier.

According to one embodiment of the present disclosure, the hydrogen oxidation reaction catalyst may be one in which the catalyst metal is carried in an amount of 10 parts by weight to 150 parts by weight, 30 parts by weight to 120 parts by weight, or 50 parts by weight to 100 parts by weight with respect to 100 parts by weight of the conductive material. Within such range, the hydrogen oxidation reaction catalyst may improve activation of a hydrogen oxidation reaction while sufficiently securing electrode stability and ionic conductivity by the conductive material.

According to one embodiment of the present disclosure, the binder may be an ion conductive polymer. As a specific example, the ion conductive polymer may be a polymer having a cation exchange group selected from a group consisting of a sulfonic acid group, a carboxylic acid group, a phosphoric acid group, a phosphonic acid group, and derivatives thereof in a side chain.

According to one embodiment of the present disclosure, the ion conductive polymer may be at least one ion conductive polymer selected from a group consisting of a fluorine-based polymer, a benzimidazole-based polymer, a polyimide-based polymer, a polyetherimide-based polymer, a polyphenylene sulfide-based polymer, a polysulfone-based polymer, a polyethersulfone-based polymer, a polyether ketone-based polymer, a polyether-ether ketone-based polymer, and a polyphenylquinoxaline-based polymer.

According to one embodiment of the present disclosure, the ion conductive polymer may be a poly(perfluorosulfonic acid), a poly(perfluorocarboxylic acid), or a copolymer of tetrafluoroethylene and fluorovinyl ether containing a sulfonic acid group. In addition, the ion conductive polymer may be an ion conductive polymer with the cation exchange group selected from the group consisting of the sulfonic acid group, the carboxylic acid group, the phosphoric acid group, the phosphonic acid group, and the derivatives thereof coupled to the side chain among aryl ketones, poly(2,2'-m-phenylene)-5,5'-bibenzimidazole, and poly(2,5-benzimidazole).

According to one embodiment of the present disclosure, the binder may be of one type or a mixture of two or more types, and may further contain a non-conductive compound when necessary. In this case, adhesion to a polymer electrolyte membrane may be further improved. In this regard, the non-conductive compound may be at least one selected from a group consisting of polytetrafluoroethylene (PTFE), a tetrafluoroethylene-hexafluoropropylene copolymer (FEP), a tetrafluoroethylene-perfluoroalkylvinylether copolymer (PFA), ethylene/tetrafluoroethylene (ETFE), an ethylene chlorotrifluoroethylene copolymer (ECTFE), polyvinylideneflu-4-oride, a copolymer (PVdF-HFP) of polyvinylidenefluoride-hexafluoropropylene, dodecylbenzenesulfonic acid, and sorbitol.

According to one embodiment of the present disclosure, in preparing the first catalyst slurry, the first solvent may be a dispersant for mixing the hydrogen oxidation reaction catalyst and the binder with each other and dispersing the hydrogen oxidation reaction catalyst and the binder. As a specific example, the first solvent may be an aqueous solvent or an organic solvent. The aqueous solvent may include water, alcohol, or a mixture thereof. The alcohol may be at least one selected from a group consisting of primary alcohols such as ethanol, isopropyl alcohol, and the like, and polyols such as ethylene glycol, propylene glycol, 1,3-butylene glycol, dipropylene glycol, and the like. In addition, the organic solvent may be at least one selected from a group consisting of N-methyl-2-pyrrolidone (NMP), N,N-dimethylacetamide (DMAc), and N,N-dimethylformamide (DMF).

According to one embodiment of the present disclosure, step (S20), which is the step of heat-treating and pulverizing the first catalyst slurry to prepare the catalyst precursor powder, is characterized in that the catalyst precursor powder is first obtained from the first catalyst slurry without coating or transferring the catalyst slurry directly onto the substrate to form a coating layer. It is necessary to properly introduce the oxygen evolution reaction catalyst to improve durability against a reverse voltage by improving a water decomposition performance of the negative electrode (a hydrogen electrode) even when the fuel cell catalyst electrode is exposed to a reverse voltage environment. However, as described above, when the oxygen evolution reaction catalyst is directly introduced into the first catalyst slurry in step S10, there is a problem that even the oxygen evolution reaction catalyst is covered by the binder. Accordingly, the oxygen evolution reaction catalyst is not sufficiently exposed in the catalyst layer, so that there is a limit in inducing an oxygen evolution reaction. Therefore, it is not able to be said that the durability against the reverse voltage environment is sufficient, and as a fuel shortage continues, the fuel shortage eventually causes the fuel cell catalyst electrode to deteriorate.

Therefore, to make a ratio of the oxygen evolution reaction catalyst exposed out of the binder higher than a ratio of the oxygen evolution reaction catalyst existing between the hydrogen oxidation reaction catalyst and the binder, the fuel cell catalyst electrode preparing method of the present disclosure obtains the catalyst precursor powder by present step (S20), and then, introduces the oxygen evolution reaction catalyst in step S30 that is a subsequent step.

According to one embodiment of the present disclosure, the heat-treatment in step S20 may be performed at a temperature range from 100° C. to 200° C., from 100° C. to 180° C., or from 100° C. to 150° C. Within such range, mechanical stability of the binder may be improved, at the same time, changes in crystallinity and an ion channel size may be minimized, and a catalyst precursor in which the first solvent present in the first catalyst slurry is entirely removed may be prepared.

According to one embodiment of the present disclosure, the pulverization in step S20 may be performed using a pulverizing apparatus that is commonly used to obtain a mass of the catalyst precursor obtained by the heat-treatment in a powder form.

According to one embodiment of the present disclosure, the catalyst precursor powder prepared in step S20 may exist in a form in which some or all of hydrogen oxidation reaction catalyst particles may be covered with the binder and the hydrogen oxidation reaction catalyst particles are bound by the binder.

According to one embodiment of the present disclosure, the step S30, which is the step of dispersing the catalyst precursor powder, the oxygen evolution reaction catalyst, and the second solvent and mixing the catalyst precursor powder, the oxygen evolution reaction catalyst, and the second solvent with each other to prepare the second catalyst slurry, is a step performed to make the ratio of the oxygen evolution reaction catalyst exposed out of the binder higher than the ratio of the oxygen evolution reaction catalyst existing between the hydrogen oxidation reaction catalyst and the binder. As such, when the second catalyst slurry is prepared by dispersing the catalyst precursor powder to which the hydrogen oxidation reaction catalyst and the binder are already coupled and the oxygen evolution reaction catalyst and mixing the catalyst precursor powder and the oxygen evolution reaction catalyst with each other using the second solvent, the introduction of the oxygen evolution reaction catalyst between the hydrogen oxidation reaction catalyst and the binder may be minimized, as well as inducing the oxygen evolution reaction catalyst to settle at a location outside the binder may be possible. Here, the ratio of the oxygen evolution reaction catalyst exposed out of the binder and the ratio of the oxygen evolution reaction catalyst existing between the hydrogen oxidation reaction catalyst and the binder mean a number ratio, a weight ratio or a volume ratio.

According to one embodiment of the present disclosure, the oxygen evolution reaction catalyst may include an iridium oxide, a ruthenium oxide, or a mixture thereof, and may be the iridium oxide as a specific example.

According to one embodiment of the present disclosure, the oxygen evolution reaction catalyst may be mixed in an amount of 10 parts by weight to 90 parts by weight, 20 parts by weight to 80 parts by weight, 20 parts by weight to 70 parts by weight, or 25 parts by weight to 50 parts by weight with respect to 100 parts by weight of the hydrogen oxidation reaction catalyst. Within such range, activation of the catalyst of the electrode for the hydrogen oxidation reaction may be sufficiently secured, and the durability may be sufficiently secured as the water decomposition performance is improved when exposed to the reverse voltage environment.

According to one embodiment of the present disclosure, in preparing the second catalyst slurry, the second solvent may be a dispersant for mixing the catalyst precursor powder and the oxygen evolution reaction catalyst with each other and dispersing the catalyst precursor powder and the oxygen evolution reaction catalyst. As a specific example, the second solvent may be the same as or different from the first solvent described above, and may be the aqueous solvent or the organic solvent. The aqueous solvent may include the water, the alcohol, or the mixture thereof. The alcohol may be at least one selected from the group consisting of the primary alcohols such as the ethanol, the isopropyl alcohol, and the like, and the polyols such as the ethylene glycol, the propylene glycol, the 1,3-butylene glycol, the dipropylene glycol, and the like. In addition, the organic solvent may be at least one selected from the group consisting of the N-methyl-2-pyrrolidone (NMP), the N,N-dimethylacetamide (DMAc), and the N,N-dimethylformamide (DMF).

According to one embodiment of the present disclosure, as step S30 is the step performed to settle the oxygen evolution reaction catalyst at the location outside the binder, step S30 may be performed without adding an additional binder other than the binder mixed in step S10.

According to one embodiment of the present disclosure, step S40, which is the step of preparing the electrode with the catalyst layer by coating or transferring the second catalyst slurry onto the substrate, may be a step for obtaining the fuel cell catalyst electrode.

According to one embodiment of the present disclosure, step S40 may include a drying step for drying the second solvent contained in the second catalyst slurry or a heat-treatment step for volatilizing the second solvent.

According to one embodiment of the present disclosure, the substrate is a support layer for preparing the fuel cell catalyst electrode from the second catalyst slurry. Any substrate that may be used for the fuel cell catalyst electrode may be used without particular limitation. In addition, the substrate may be the polymer electrolyte membrane itself in some cases.

The present disclosure provides the fuel cell catalyst electrode prepared from the method for preparing the fuel cell catalyst electrode.

According to one embodiment of the present disclosure, the fuel cell catalyst electrode may include the substrate; and the catalyst layer formed on a surface of at least one side of the substrate. The catalyst layer may contain the hydrogen oxidation reaction catalyst, the oxygen evolution reaction catalyst, and the binder. The ratio of the oxygen evolution reaction catalyst exposed out of the binder may be higher than the ratio of the oxygen evolution reaction catalyst existing between the hydrogen oxidation reaction catalyst and the binder. As such, as the ratio of the oxygen evolution reaction catalyst exposed out of the binder is increased, both of the hydrogen oxidation reaction (HOR) and the oxygen evolution reaction (OER) may occur effectively. In addition, while sufficiently securing the activation of the catalyst of the electrode for the hydrogen oxidation reaction, the durability may be sufficiently secured as the water decomposition performance is improved when exposed to the reverse voltage environment.

In addition, the present disclosure provides a membrane electrode assembly including the polymer electrolyte membrane. The membrane electrode assembly may include the negative electrode; a positive electrode; and the polymer electrolyte membrane interposed between the negative electrode and the positive electrode, and the negative electrode may be the fuel cell catalyst electrode according to the present disclosure.

According to one embodiment of the present disclosure, the membrane electrode assembly may be an assembly of an electrode in which an electrochemical catalyst reaction of fuel such as hydrogen gas and air containing oxygen occurs and a polymer electrolyte membrane in which hydrogen ion transfer occurs, and may be the negative electrode, the positive electrode, and the polymer electrolyte membrane interposed between the negative electrode and the positive electrode that are adhered to each other.

According to one embodiment of the present disclosure, the membrane electrode assembly may have a gas diffusion layer introduced onto one surface of each of the negative electrode (a fuel electrode or the hydrogen electrode) supplying a reaction gas and the positive electrode (an oxygen electrode or an air electrode). As a specific example, the membrane electrode assembly may be interposed between the gas diffusion layers respectively introduced onto the surfaces of the negative electrode and the positive electrode.

According to one embodiment of the present disclosure, the membrane electrode assembly may have the catalyst layer introduced onto the other surface of each of the negative electrode (the fuel electrode or the hydrogen electrode) supplying the reaction gas and the positive electrode (the oxygen electrode or the air electrode). As a specific example, the polymer electrolyte membrane may be interposed between the catalyst layers respectively introduced onto the surfaces of the negative electrode and the positive electrode.

According to one embodiment of the present disclosure, the membrane electrode assembly may be a stacked structure having one type of stack configuration selected from a group consisting of the negative electrode/the polymer electrolyte membrane/the positive electrode, the gas diffusion layer/the negative electrode/the polymer electrolyte membrane/the positive electrode, the negative electrode/the polymer electrolyte membrane/the positive electrode/the gas diffusion layer, the gas diffusion layer/the negative electrode/the polymer electrolyte membrane/the positive electrode/the gas diffusion layer, the negative electrode/the catalyst layer/the polymer electrolyte membrane/the positive electrode, the negative electrode/the polymer electrolyte membrane/the catalyst layer/the positive electrode, the negative electrode/the catalyst layer/the polymer electrolyte membrane/the catalyst layer/the positive electrode, the gas diffusion layer/the catalyst layer/the negative electrode/the polymer electrolyte membrane/the positive electrode, the gas diffusion layer/the negative electrode/the polymer electrolyte membrane/the catalyst layer/the positive electrode, the gas diffusion layer/the catalyst layer/the negative electrode/the polymer electrolyte membrane/the catalyst layer/the positive electrode, the negative electrode/the polymer electrolyte membrane/the catalyst layer/the positive electrode/the gas diffusion layer, the negative electrode/the catalyst layer/the polymer electrolyte membrane/the positive electrode/the gas diffusion layer, the negative electrode/the catalyst layer/the polymer electrolyte membrane/the catalyst layer/positive electrode/the gas diffusion layer, and the gas diffusion layer/the catalyst layer/the negative electrode/the polymer electrolyte membrane/the catalyst layer/the positive electrode/the gas diffusion layer.

According to one embodiment of the present disclosure, the negative electrode may be the fuel cell catalyst electrode described above, and accordingly, the catalyst layer may be the catalyst layer of the fuel cell catalyst electrode described above.

According to one embodiment of the present disclosure, the catalyst layer of the positive electrode may contain the catalyst metal and the conductive material carrying the catalyst metal. The catalyst of the positive electrode may contain a metal that promotes a reduction reaction of the oxygen, and may be, as a specific example, the platinum, the gold, the silver, the palladium, the iridium, the rhodium, the ruthenium, the iron, the cobalt, the nickel, the chromium, the tungsten, the manganese, the vanadium, and the alloys thereof. In addition, the conductive material may be the activated carbon. In addition, the catalyst layer of the positive electrode may contain the same ion conductive polymer as the binder of the fuel cell catalyst electrode as the binder.

According to one embodiment of the present disclosure, the polymer electrolyte membrane may be the ion conductive polymer, and may be the same ion conductive polymer as the binder of the fuel cell catalyst electrode described above. As another example, the ion conductive polymer may be an ion conductive polymer containing a sulfonic acid group.

According to one embodiment of the present disclosure, the ion conductive polymer containing the sulfonic acid group may be at least one selected from a group consisting of the fluorine-based polymer, a hydrocarbon-based polymer, and a partially fluorine-based polymer that is sulfonated. In this case, hydrogen ion conductivity and reaction gas barrier property are excellent.

According to one embodiment of the present disclosure, the sulfonated fluorine-based polymer maybe at least one selected from a group consisting of the poly(perfluorosulfonic acid), the poly(perfluorocarboxylic acid), and the copolymer of the tetrafluoroethylene and the fluorovinyl ether containing the sulfonic acid group.

According to one embodiment of the present disclosure, the sulfonated hydrocarbon-based polymer may be at least one selected from a group consisting of sulfonated polyimide, sulfonated polyaryl ether sulfone, sulfonated polyether ether ketone, Sulfonated polybenzimidazole, sulfonated polysulfone, sulfonated polystyrene, sulfonated polyphosphazene, sulfonated polyetherethersulfone, sulfonated polyethersulfone, sulfonated polyetherbenzimidazole, sulfonated polyarylene ether ketone, sulfonated polyether ketone, sulfonated polystyrene, sulfonated polyimidazole, sulfonated polyetherketoneketone, and sulfonated polyaryletherbenzimidazole.

According to one embodiment of the present disclosure, the sulfonated partially fluorine-based polymer may be at least one selected from a group consisting of sulfonated poly(aryleneethersulfone-co-vinylidenefluoride), sulfonated trifluorostyrene-graft-poly(tetrafluoroethylene), and styrene-grafted sulfonated polyvinylidene fluoride.

According to one embodiment of the present disclosure, the membrane electrode assembly may be prepared by compression such as thermocompression bonding in a state in which the negative electrode; the positive electrode; and the polymer electrolyte membrane interposed between the negative electrode and the positive electrode are in close contact with each other. In addition, the membrane electrode assembly may be prepared by directly applying and drying a catalyst layer slurry for forming the catalyst layers of the negative electrode and the positive electrode on one surface or both surfaces of the polymer electrolyte membrane.

According to one embodiment of the present disclosure, the gas diffusion layer may have a double-layer structure of a micro-porous layer (MPL) and a macro-porous substrate. The micro-porous layer may be prepared by mixing carbon powder, such as acetylene black carbon and black pearls carbon, with a polytetrafluoroethylene (PTFE)-based hydrophobic agent, and then, may be applied onto one surface or both surfaces of the macro-porous substrate depending on an application. The macro-porous substrate may be composed of carbon fiber and a polytetrafluoroethylene-based hydrophobic agent. As a specific example, the carbon fiber such as carbon fiber cloth, carbon fiber felt, carbon fiber paper, and the like may be used.

In addition, the present disclosure provides the fuel cell including the membrane electrode assembly. The fuel cell may include a stack, a fuel supply part, and an oxidant supply part.

According to one embodiment of the present disclosure, the stack may include one or at least two membrane electrode assemblies. When the at least two membrane electrode assemblies are included, a bipolar plate interposed therebetween may be included. The bipolar plate delivers a fuel and an oxidizer supplied from the outside to the membrane electrode assemblies, and at the same time, acts as a conductor that connects the negative electrode and the positive electrode with each other in series.

According to one embodiment of the present disclosure, the fuel supply part may supply the fuel to the stack, and may include a fuel tank for storing the fuel and a pump for supplying the fuel stored in the fuel tank to the stack. As the fuel, a gas or liquid hydrogen or hydrocarbon fuel may be used. Examples of the hydrocarbon fuel may include alcohol such as methanol, ethanol, propanol, and butanol, or natural gas.

According to one embodiment of the present disclosure, the oxidizing agent supply part may supply an oxidizing agent to the stack. As the oxidizing agent, the air may be typically used, and the oxygen or the air may be used by being injected via the pump.

According to one embodiment of the present disclosure, the fuel cell may be a polymer electrolyte membrane fuel cell, a direct liquid fuel cell, a direct methanol fuel cell, a direct formic acid fuel cell, a direct ethanol fuel cell, a direct dimethyl ether fuel cell, or the like.

Hereinafter, Example of the present disclosure will be described in detail such that a person having ordinary knowledge in the technical field to which the present disclosure belongs may easily implement the same. However, the present disclosure may be implemented in several different forms and is not limited to Example described herein.

EXAMPLE 13.6 parts by weight of a 50 wt % Pt/C catalyst (Pt:C weight ratio 1:1, Tanaka Kikinzoku Kogyo KK) and 4.1 parts by weight of an ionomer (AsahiKasei co.) as the binder were added into 100 parts by weight of a solvent in which dipropylene glycol and water are mixed with each other in a weight ratio of 1:1, and the Pt/C catalyst and the ionomer were uniformly dispersed and mixed with each other using a 3-roll mill to prepare a first catalyst slurry. Thereafter, the first catalyst slurry was dried at 120° C. for 2 hours using a vacuum oven, and then finely pulverized with a mortar to obtain catalyst precursor powder. Thereafter, 17.7 parts by weight of the obtained catalyst precursor powder and 3.4 parts by weight of an iridium oxide ($IrO_2$) were added to 100 parts by weight of the solvent in which the dipropylene glycol and the water are mixed with each other in the weight ratio of 1:1, and the iridium oxide and the solvent were uniformly dispersed and mixed with each other using the 3-roll mill to prepare a second catalyst slurry. The prepared second catalyst slurry was coated on a fluorinated polyimide (FPI, FM2 co.) film at 0.05 mg/cm$^2$ and dried at 60° C. for 2 hours using a drying oven to prepare a fuel cell catalyst electrode.

Comparative Example 13.6 parts by weight of the 50 wt % Pt/C catalyst (Pt:C weight ratio 1:1, Tanaka Kikinzoku Kogyo KK), 4.1 parts by weight of the ionomer (AsahiKasei co.) as the binder, and 3.4 parts by weight of the iridium oxide (IrO$_2$) were added into 100 parts by weight of the solvent in which the dipropylene glycol and the water are mixed with each other in the weight ratio of 1:1, and the Pt/C catalyst, the ionomer, and the iridium oxide were uniformly dispersed and mixed with each other using the 3-roll mill to prepare a catalyst slurry. The prepared catalyst slurry was coated on the fluorinated polyimide (FPI, FM2 co.) film at 0.05 mg/cm$^2$ and dried at 60° C. for 2 hours using the drying oven to prepare a fuel cell catalyst electrode.

Experimental Example

To identify durability over time of exposure to the reverse voltage environment of the fuel cell catalyst electrodes prepared in Example and Comparative Example, a beginning of life (BOL) was measured and an end of life (EOL) for each time based on a reverse voltage test was measured in a following manner to calculate a performance degradation amount and a performance degradation rate. The performance degradation amount and the performance degradation rate are shown in Table 1.

Reverse voltage test: While supplying nitrogen instead of hydrogen to the fuel cell catalyst electrodes prepared in Examples and Comparative Examples under conditions of an atmospheric pressure, a relative humidity 50%, and 200 ma/cm$^2$, the end of life (EOL) of 1 hour to 5 hours was measured, the performance degradation amount was calculated based on Mathematical Equation 1 below, and the performance degradation rate was calculated based on Mathematical Equation 2 below.

Performance degradation amount (mV)=BOL−EOL$_x$
($x$ is time) [Mathematical Equation 1]

Performance degradation rate (%)=(BOL−EOL$_x$)/BOL*100 ($x$ is time) [Mathematical Equation 2]

TABLE 1

| Division | | | 1 hour | 2 hours | 3 hours | 4 hours | 5 hours |
|---|---|---|---|---|---|---|---|
| Example | Performance degradation amount | (mV) | 14 | 26 | 30 | 22 | 29 |
| | Performance degradation rate | (%) | 2.29 | 4.26 | 4.91 | 3.6 | 4.75 |
| Comparative Example | Performance degradation amount | (mV) | 10 | 27 | 40 | 46 | 46 |
| | Performance degradation rate | (%) | 1.59 | 4.3 | 6.37 | 7.33 | 7.33 |

As shown in Table 1 above, it was identified that, compared to the fuel cell catalyst electrode of Comparative Example in which the oxygen evolution reaction catalyst was prepared with the hydrogen oxidation reaction catalyst and the binder with no distinction between steps S10 to S30 according to the present disclosure, the fuel cell catalyst electrode of Example prepared according to the present disclosure may minimize performance degradation even when exposed to the reverse voltage environment for a long time.

This is derived from that, as shown in FIG. 1, compared to the fuel cell catalyst electrode of Comparative Example, the fuel cell catalyst electrode of Example prepared according to the present disclosure has the ratio of the oxygen evolution reaction catalyst exposed to the outside of the binder higher than the ratio of the oxygen evolution reaction catalyst existing between the hydrogen oxidation reaction catalyst and the binder.

From such result, it was identified that, in the fuel cell catalyst electrode prepared according to the method for preparing the fuel cell catalyst electrode according to the present disclosure, as both of the hydrogen oxidation reaction (HOR) and the oxygen evolution reaction (OER) may occur effectively, while sufficiently securing the activation of the catalyst of the electrode for the hydrogen oxidation reaction, the durability may be sufficiently secured as the water decomposition performance is improved when exposed to the reverse voltage environment.

In the fuel cell catalyst electrode prepared according to the method for preparing the fuel cell catalyst electrode according to the present disclosure, both the hydrogen oxidation reaction (HOR) and the oxygen evolution reaction (OER) may occur effectively, so that while sufficiently securing the activation of the catalyst of the electrode for the hydrogen oxidation reaction, the durability may be sufficiently secured as the water decomposition performance is improved when exposed to the reverse voltage environment.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for preparing a fuel cell catalyst electrode, the method comprising:
   dispersing and mixing a hydrogen oxidation reaction catalyst, a binder, and a first solvent to prepare a first catalyst slurry;
   heat-treating and pulverizing the first catalyst slurry to prepare catalyst precursor powder;
   dispersing and mixing the catalyst precursor powder, an oxygen evolution reaction catalyst, and a second solvent to prepare a second catalyst slurry; and
   preparing an electrode with a catalyst layer by coating or transferring the second catalyst slurry onto a substrate.

2. The method of claim 1, wherein the hydrogen oxidation reaction catalyst comprises a catalyst metal and a conductive material carrying the catalyst metal.

3. The method of claim 2, wherein the catalyst metal comprises at least one selected from a group consisting of platinum, gold, silver, palladium, iridium, rhodium, ruthenium, iron, cobalt, nickel, chromium, tungsten, manganese, vanadium, and alloys thereof.

4. The method of claim 2, wherein the conductive material includes activated carbon.

5. The method of claim 1, wherein the binder includes an ion conductive polymer.

6. The method of claim 1, wherein the heat-treatment of step is performed in a temperature range from 100° C. to 200° C.

7. The method of claim 1, wherein the oxygen evolution reaction catalyst comprises an iridium oxide, a ruthenium oxide, or a mixture thereof.

8. The method of claim 1, wherein the oxygen evolution reaction catalyst is mixed in an amount from 10 parts by weight to 90 parts by weight with respect to 100 parts by weight of the hydrogen oxidation reaction catalyst.

9. A fuel cell catalyst electrode comprising:
a substrate; and
a catalyst layer disposed on a surface of at least one side of the substrate,
wherein the catalyst layer comprises a mixture of a hydrogen oxidation reaction catalyst, an oxygen evolution reaction catalyst, and a binder, in which the hydrogen oxidation reaction catalyst, the oxygen evolution reaction catalyst, and the binder are mixed with each other,
wherein the oxygen evolution reaction catalyst is dispersed in the binder, and a ratio of the oxygen evolution reaction catalyst exposed to the outside of the binder is higher than a ratio of the oxygen evolution reaction catalyst existing between the hydrogen oxidation reaction catalyst and the binder.

10. The fuel cell catalyst electrode of claim 9, wherein the hydrogen oxidation reaction catalyst comprises a catalyst metal and a conductive material carrying the catalyst metal.

11. The fuel cell catalyst electrode of claim 10, wherein the catalyst metal comprises at least one selected from a group consisting of platinum, gold, silver, palladium, iridium, rhodium, ruthenium, iron, cobalt, nickel, chromium, tungsten, manganese, vanadium, and alloys thereof.

12. The fuel cell catalyst electrode of claim 10, wherein the conductive material includes activated carbon.

13. The fuel cell catalyst electrode of claim 9, wherein the binder includes an ion conductive polymer.

14. The fuel cell catalyst electrode of claim 9, wherein the oxygen evolution reaction catalyst comprises an iridium oxide, a ruthenium oxide, or a mixture thereof.

15. The fuel cell catalyst electrode of claim 9, wherein the oxygen evolution reaction catalyst is in an amount from 10 parts by weight to 90 parts by weight with respect to 100 parts by weight of the hydrogen oxidation reaction catalyst.

16. A membrane electrode assembly comprising:
a negative electrode;
a positive electrode; and
a polymer electrolyte membrane interposed between the negative electrode and the positive electrode,
wherein the negative electrode is the fuel cell catalyst electrode of claim 9.

17. A fuel cell comprising the membrane electrode assembly of claim 16.

* * * * *